Figure 1:
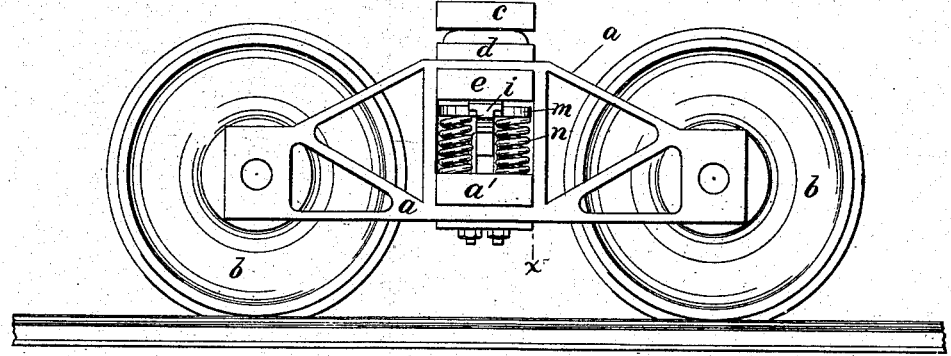

(No Model.)

J. A. TILDEN.
Car Spring.

No. 240,623. Patented April 26, 1881.

Witnesses:
V. D. Dearborn.
A. Reynolds.

Inventor:
James A. Tilden
by Crosby & Gregory Attys.

UNITED STATES PATENT OFFICE.

JAMES A. TILDEN, OF HYDE PARK, ASSIGNOR TO CHARLES H. HERSEY AND FRANCIS C. HERSEY, OF BOSTON, MASSACHUSETTS.

CAR-SPRING.

SPECIFICATION forming part of Letters Patent No. 240,623, dated April 26, 1881.

Application filed September 25, 1880. (No model.)

*To all whom it may concern:*

Be it known that I, JAMES A. TILDEN, of Hyde Park, county of Norfolk, State of Massachusetts, have invented an Improvement in Car-Springs, of which the following description, in connection with the accompanying drawings, is a specification.

My invention relates to car-springs and the framing by which their action is transmitted from the trucks or frame-work connected with the car-wheels to the car-body, and has for its object to make the relative effect of the weight of the car-body and its load upon the said springs variable in accordance with the amount of the weight, the relative effect of the said weight increasing as its actual amount decreases, so that the springs have a similar yielding operation and easing effect whether the car be empty or loaded. When the force of the spring is applied directly from the truck to the car-body, as is now commonly done, the said spring has to be made strong enough to operate properly when the car is loaded, and consequently will be so stiff as to scarcely operate at all under the weight of the empty car, while, if it should be made light enough to properly operate with an empty or slightly-loaded car, it would be wholly compressed and inoperative for a heavily-loaded car.

My invention consists in transmitting the force of a spring, which is made of proper strength to operate directly when the car is loaded from the truck to the car, by means of a mechanical device (shown as a bearing-lever) so constructed and arranged that the lever-arm, upon which the car-body rests, is automatically or self adjustable in length in accordance with the weight sustained by it, the leverage or mechanical advantage of the weight being increased as its amount is diminished. As shown, the bearing-levers have a fulcrum at one end connected with the frame-work of the truck, and rest at an intermediate point upon the springs, while the arm of the lever, extending from the spring on the side away from the fulcrum, is adapted to receive the weight of the car at a point of application the position of which varies in distance from the extremity of the lever in accordance with the amount of weight of the car and its load resting thereon. This lever is so arranged relatively to the strength of the spring that in its normal condition, when the car is not loaded, it inclines upward from its pivoted or fulcrumed extremity to the movable extremity on which the car-body rests, and if, as herein shown, the force of the spring is applied at a point half-way between these extremities, a weight applied at the said outer extremity will have the same effect in compressing the spring, or in being supported or eased thereby, that a weight of double the amount would have when resting directly on the said spring.

The arm of the lever sustaining the car-body is made curved at its upper surface, upon which the said frame of the said car-body rests, tangent to said curve, in such a manner that as the lever is depressed, owing to the compression of the springs as the car is loaded and the curved portion changes its position, the tangent-point to the said curve, which forms the point of application of said load, becomes more distant from the extremity of the lever in proportion to the amount of the load or the total weight sustained thereon. As the load in the car is increased the springs are compressed and the levers depressed more and more, and the bearing-points of the load on the said levers approach a position directly above the said springs until, at length, when the maximum load is reached, the levers are horizontal and the weight upon the car resting on them is supported directly by the springs, which are, as before stated, of suitable strength to properly operate under the action of the maximum load thus directly applied.

Figure 2:
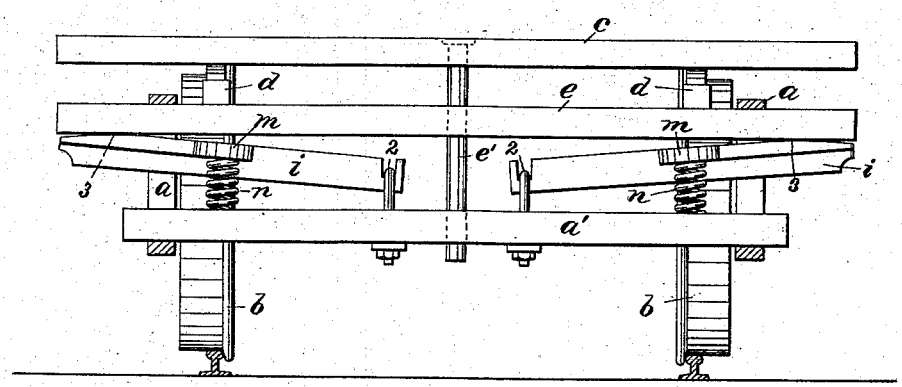
Figure 3:
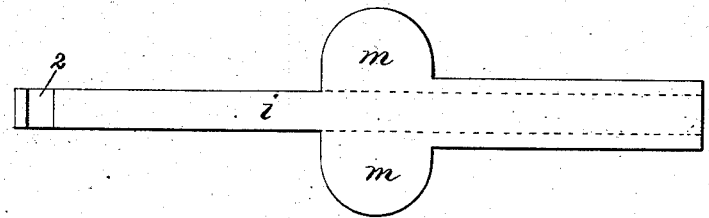

Figure 1 is a side-elevation of a car-truck and a portion of the frame-work of the car-body supported thereon by springs and levers arranged in accordance with my invention; Fig. 2, a transverse section thereof on line $xx$, Fig. 1; and Fig. 3, a top view of one of the bearing-levers detached.

The truck-frame $a$, supported on the journals of the wheels $b$ in the usual manner, may be of any ordinary construction.

The car-body, which is not shown in the drawings, is supported on the cross-beam $c$, itself resting on blocks $d$ upon the cross-bar $e$, which is arranged in line with and above the main supporting cross-beam $a'$ of the truck-frame $a$. A guide-rod, $e'$, passes through the cross-beams c, e, and a', and serves to keep the latter and the truck in proper position relative to the car-body, the said guide-rod being free to move through the beam a' as the car-body rises and falls on its springs.

The cross-bar e, sustaining the entire weight of the car-body and its load, rests on the bearing-levers i, having their fulcrums at 2 upon links connected with the cross-beam a' of the truck. The said bearing-levers i, forming the car-body-sustaining devices, have at an intermediate point bearing-surfaces m, resting on the springs n, which are themselves supported on the cross-beam a'. The fulcrums 2 of the levers i are so placed that when the springs m are only slightly compressed the levers i will have a position somewhat inclined. The extremities of the said levers, upon which the beam e rests, are curved, as shown at 3, this curve being such that when the springs n are least compressed, the levers i being then most inclined under the action of the weight of the empty car-body, the bar e, the under surface of which is tangent to the said curve, will touch the said curves and be supported thereon at the extremities of the levers i.

As the car is loaded and the weight upon the cross-bar e is thus increased, the spring n will be compressed and the bearing-levers i be brought more nearly toward the horizontal position, and the point of support of the cross-bar e on the curved surface 3 of the said levers will be brought more nearly above the springs n, as shown in Fig. 2, where the parts are shown in position assumed when the car is partially loaded, and consequently the effect of the said weight on the said springs relative to the amount thereof will be diminished in proportion as its amount is increased, so that the actual effect on the springs to compress them will remain nearly constant. When loaded with the maximum load the levers i will be brought to a horizontal position and the cross-bars e will bear directly on the bearing-points m of the springs n, so that the effect will be the same as if the cross-bars e rested directly on the springs n, as in the usual construction. The ends of the bearing-levers i are slotted at 2 above the part resting against the fulcrum-pieces, so that when the cross-bar e rests on the said levers, directly over the bearing-points m thereof, the said levers will be free to move up and down bodily as the spring yields.

I claim—

1. The supporting-base, lever fulcrumed thereon, and spring, combined with the load-sustaining frame supported upon the said lever, the bearing-surfaces of the said lever and frame being constructed as described, whereby as the load is increased and the spring compressed thereby its leverage or mechanical advantage is varied in inverse proportion to the amount of the said load, substantially as described.

2. A supporting-base, a lever fulcrumed at one end thereupon, a bearing-arm of said lever having a curved end, and a spring interposed between the fulcrum and the bearing-arm, combined with a load-sustaining frame supported initially at a tangent upon the curved-end bearing-arm, whereby as the lever is depressed the effective length of its bearing-arm, and consequently the leverage or mechanical advantage of the weight sustained thereon, is varied in inverse proportion to the amount of the said weight, substantially as and for the purpose set forth.

3. A supporting-base, a lever fulcrumed at one end thereupon and bearing loosely and disconnectedly upon its other end the load-supporting frame, and a spring interposed between the fulcrum and bearing end of said lever, whereby when the said lever yields under the superposed load its effective leverage is varied in inverse proportion to the weight of the load, and the spring finally permitted to act immediately, substantially as described.

4. In a car-truck, a base, a', levers i, fulcrumed at one end to said base, and having their other ends made as curved bearings, 3, combined with springs n, interposed between said fulcra and bearing ends, and a load-sustaining frame superposed upon said levers, substantially as described.

5. The levers i, having slots to receive fulcral devices at one end, and also having bearing ends to support a load-sustaining frame, combined with springs connected with said levers, whereby the levers are permitted to assume a horizontal position under the weight of the load and throw such weight upon the springs, substantially as described.

In testimony whereof I have signed my name to this specification in the presence of two subscribing witnesses.

JAMES A. TILDEN.

Witnesses:
JOS. P. LIVERMORE,
L. F. CONNOR.